No. 661,023. Patented Oct. 30, 1900.
D. C. RIPLEY & F. L. O. WADSWORTH.
PRISM GLASS.
(Application filed July 27, 1899.)
(No Model.)
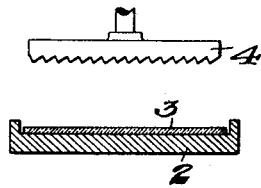
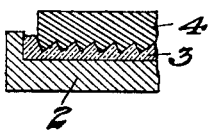
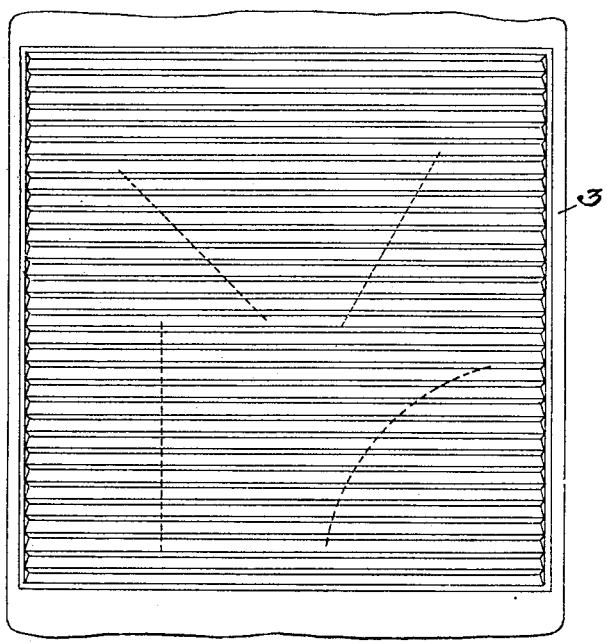
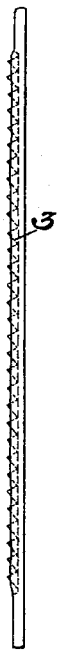
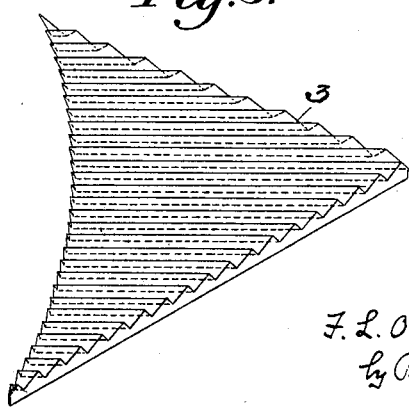
WITNESSES
INVENTORS
F. L. O. Wadsworth, D. C. Ripley
by Bakewell & Bakewell
their attorneys.
THE NORRIS PETERS CO., PHOTO-LITHO., WASHINGTON, D. C.

UNITED STATES PATENT OFFICE.

DANIEL C. RIPLEY, OF PITTSBURG, AND FRANK L. O. WADSWORTH, OF ALLEGHENY, PENNSYLVANIA, ASSIGNORS TO WILLIAM A. BOND, TRUSTEE, OF CHICAGO, ILLINOIS.

PRISM-GLASS.

SPECIFICATION forming part of Letters Patent No. 661,023, dated October 30, 1900.

Application filed July 27, 1899. Serial No. 725,233. (No model.)

*To all whom it may concern:*

Be it known that we, DANIEL C. RIPLEY, of Pittsburg, and FRANK L. O. WADSWORTH, of Allegheny, county of Allegheny, and State of Pennsylvania, have invented a new and useful Improvement in Prism-Glass, of which the following is a full, clear, and exact description, reference being had to the accompanying drawings, forming part of this specification.

Our invention relates to the prism-glass employed for illuminating purposes and is designed to improve the quality of such glass and provide glass of this character which may be cut on determined lines. Heretofore in the manufacture of such prism-glass it has been the most approved practice to press the prism-surfaces in molds in the same manner in which glass articles are ordinarily pressed, a gathering of glass being placed in the mold and the plunger being brought down upon it, so as to displace it and to cause it to flow into all the portions of the mold-cavity and to assume the contour and configuration thereof. It has been found that in this method of manufacture it is not practicable to make prism plates or pieces of large size, and they generally have been made of not more than three or four inches square. The reason of this is the difficulty of causing the glass to flow in the mold. Moreover, the prism-plate when pressed, even in such small size, lacks strength and is apt to be broken. It cannot be cut with a diamond, for as soon as the surface is scored by the cutting-tool it will crack and break upon irregular lines. These practical difficulties have limited the utility of such glass-prism surfaces, for the making of the pieces in small size increases the difficulty of assembling them, and the frame in which they are assembled is expensive to make and is more or less unsightly and to some extent excludes the light. We have overcome these difficulties and have obtained a prism-plate of larger area and greater strength and which may be cut with a diamond or other cutting device either parallel with or at an angle to the prisms.

Our invention consists in the illuminator prism-plate herein described and having the characteristics of being free from internal strains and capable of being cut on determined lines, the same resulting from first rolling a body of glass into a flat mass and then molding the surface of the mass while still plastic into prism projections over the entire portion to be shaped.

We will now describe the preferred form of apparatus and the process which we employ for making this improved prism-plate.

In the drawings, Figure 1 is a longitudinal sectional elevation of one form of apparatus for carrying out our improved process, showing the table and die with a sheet therein in position to form a prism-plate. Fig. 2 is an enlarged detail section. Fig. 3 is a plan view of a prism-plate formed in accordance with our invention. Fig. 4 is an edge view of the same, and Fig. 5 is a perspective view showing the manner in which it may be cut on predetermined lines. The dotted lines in Fig. 3 are intended to indicate the capacity which our improved prism-plate possesses of being scored and cut in various directions by a glazier's cutting-tool.

We make our improved prism-plate by two steps, first forming a glass sheet of at least the required area and while such sheet is plastic impressing on its surface a series of projecting prisms which project somewhat above the original surface of the sheet and afford the required light-deflecting surface. This mode of manufacture is distinguished not only in its product but in its procedure from methods heretofore employed in which the glass was shaped and the prisms impressed thereon by the same operation. By such prior method only prisms of limited size could be made, and the glass was so strained by the operation that it could not be cut on determined lines, but had to be used in substantially the original size. By our method of manufacture the glass is not substantially spread by the pressing of the prism, it is not strained, and consequently the plate can be made of large size and with practical freedom from internal and molecular distortion.

In Figs. 1 and 2 of the drawings we show a simple form of the apparatus by which our improved prism-plates can be made.

In Fig. 1 of the present drawings, 2 represents the platen on which the glass sheet can be spread by a roller, and when spread the sheet 3 lies upon the platen, as shown in the drawings. When the sheet thus formed is still plastic, the die 4, having its face shaped to conform with the prisms which are to be compressed on the glass, is brought down upon the glass sheet and the surface of the sheet is formed thereby. The sheet is not spread laterally by this operation to any degree, the effect being merely to displace the glass beneath the points of the die upwardly into the cavities. The die is depressed sufficiently to cause the glass to completely fill the cavities and to bring the surface of the cavities into close contact with the glass, thus not only forming the prisms, raising them somewhat above the original surface of the glass sheet, but finishing the same, as well as the lower surface of the plate, by contact with the polished surface of the platen. The prism-plate is then removed from the platen 2 and annealed and is then ready for use. It can be made of large size, and by reason of the absence of distortion of the glass it can be cut by a diamond on lines either parallel with or at an angle to the prisms. Between the operation of spreading the glass sheet and the forming of the prism-pattern thereon the glass sets sufficiently or becomes sufficiently solid to retain the prism-pattern which is formed upon it without losing it by the running together of the hot glass.

We claim—

An illuminator prism-plate comprising a sheet of plate-glass having prisms molded therein while the glass is in a flat plastic state, said prisms being produced by pressure exerted in a direction transverse to the plane of the sheet upon the entire cross-section of the portion to be shaped into prisms, whereby the prism-plate is free from internal strains and capable of being cut on predetermined lines.

In testimony whereof we have hereunto set our hands.

DANIEL C. RIPLEY.
F. L. O. WADSWORTH.

Witnesses to the signature of Daniel C. Ripley:
H. M. CORWIN,
C. BYRNES.

Witnesses to the signature of F. L. O. Wadsworth:
THOMAS W. BAKEWELL,
GEO. B. BLEMMING.